US009652258B2

(12) United States Patent
Chiba

(10) Patent No.: US 9,652,258 B2
(45) Date of Patent: May 16, 2017

(54) DYNAMIC TIME ZONE DEFINITION UPDATE MANAGER

(71) Applicant: Oracle International Corporation, Redwood Shores, CA (US)

(72) Inventor: Daisuke Chiba, Livermore, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 858 days.

(21) Appl. No.: 13/932,187

(22) Filed: Jul. 1, 2013

(65) Prior Publication Data

US 2015/0006877 A1 Jan. 1, 2015

(51) Int. Cl.
G06F 9/44 (2006.01)
G06F 9/445 (2006.01)

(52) U.S. Cl.
CPC ................................ *G06F 9/44505* (2013.01)

(58) Field of Classification Search
None
See application file for complete search history.

(56) References Cited

U.S. PATENT DOCUMENTS

| | | | | |
|---|---|---|---|---|
| 7,403,933 B2 * | 7/2008 | Arend | ..................... | G06N 5/022 706/46 |
| 7,516,490 B2 * | 4/2009 | Riordan | ................. | G06F 21/554 705/66 |
| 7,916,580 B2 * | 3/2011 | Nalla | ................. | G06Q 10/1091 368/21 |
| 8,266,193 B2 | 9/2012 | Fong et al. | | |
| 2002/0145944 A1 * | 10/2002 | Wright | ................. | G04G 15/006 368/21 |
| 2005/0183072 A1 * | 8/2005 | Horning | ................... | G06F 21/14 717/140 |
| 2007/0140061 A1 | 6/2007 | Punkka | | |
| 2008/0319878 A1 * | 12/2008 | Glebe | .................... | G06Q 10/00 705/28 |
| 2012/0064891 A1 * | 3/2012 | Wijayanathan | ....... | H04W 4/021 455/435.1 |
| 2015/0323905 A1 * | 11/2015 | May | ..................... | G04G 9/0076 368/21 |

OTHER PUBLICATIONS

"Daylight Saving Time (DST) handling in Linux", http://www.novell.com/support/kb/doc.php?id=3655154, last downloaded Jul. 1, 2013.

(Continued)

*Primary Examiner* — Evral E Bodden
(74) *Attorney, Agent, or Firm* — Miles & Stockbridge P.C.

(57) ABSTRACT

A system that manages dynamic time zone definition updates can access stored time zone definitions and receive a subscription request from an application. The system can receive new time zone definitions and, while the application is being executed, update the stored time zone definitions to include the new time zone definitions. The system can then send a notification to the application that the stored time zone definitions have been updated, and the notification can cause the application to resolve impacts, if any, of the time zone definition update while the application continues to be executed.

23 Claims, 10 Drawing Sheets

(56) References Cited

OTHER PUBLICATIONS

"CICSPlex SM time zone attributes", http://publib.boulder.ibm.com/infocenter/cicsts/v3r1/index.jsp?topic=%2Fcom.ibm.cics.ts31.doc%2Feyua7%2Feyua7ek.htm, last downloaded Jul. 1, 2013.
"BlackBerry Enterprise Server", http://docs.blackberry.com/en/admin/deliverables/12063/BlackBerry_Enterprise_Server-Policy_Reference_Guide-T323212-832026-1023123101-001-5.0.1-US.pdf, last downloaded Jul. 1, 2013.
"Time Zones", http://help.sap.com/printdocu/core/print46c/en/data/pdf/CAGTFTIM/CAGTFTIM.pdf, last downloaded Jul. 1, 2013.
"Cisco AXP Features", http://www.cisco.com/en/US/docs/interfaces_modules/services_modules/ax/1.5/developer/guide/axpfeat.html, last downloaded Jul. 1, 2013.
"Internationalization and Localization", http://doc.dvgu.ru/db/mysgl/5.0/internationalization-localization.html, last downloaded Jul. 1, 2013.
"Time Zone Data Update Tool for Microsoft Office Outlook", http://www.microsoft.com/en-us/download/details.aspx?id=17291, last downloaded Aug. 30, 2012.

\* cited by examiner

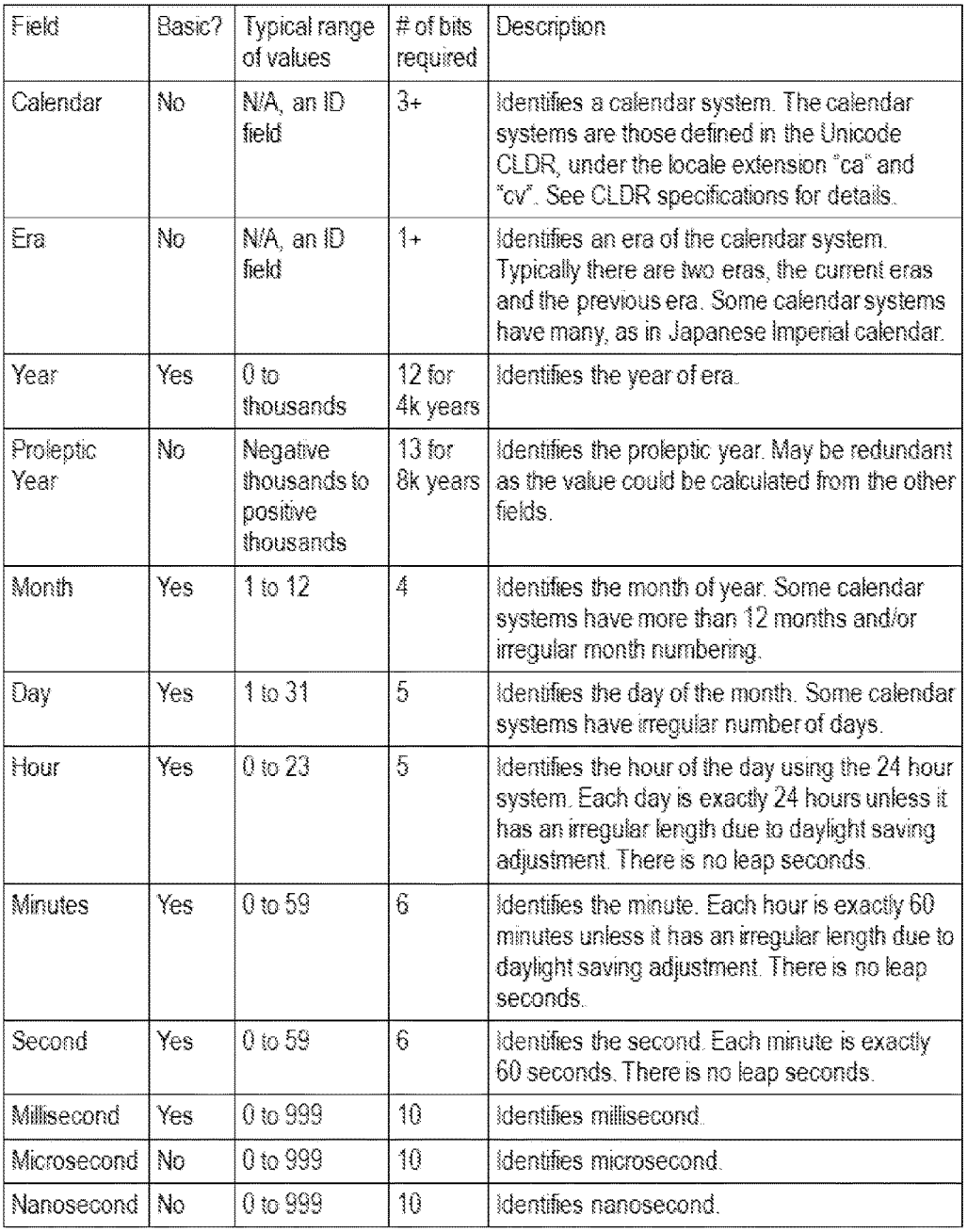

| Field | Basic? | Typical range of values | # of bits required | Description |
|---|---|---|---|---|
| Calendar | No | N/A, an ID field | 3+ | Identifies a calendar system. The calendar systems are those defined in the Unicode CLDR, under the locale extension "ca" and "cv". See CLDR specifications for details. |
| Era | No | N/A, an ID field | 1+ | Identifies an era of the calendar system. Typically there are two eras, the current eras and the previous era. Some calendar systems have many, as in Japanese Imperial calendar. |
| Year | Yes | 0 to thousands | 12 for 4k years | Identifies the year of era. |
| Proleptic Year | No | Negative thousands to positive thousands | 13 for 8k years | Identifies the proleptic year. May be redundant as the value could be calculated from the other fields. |
| Month | Yes | 1 to 12 | 4 | Identifies the month of year. Some calendar systems have more than 12 months and/or irregular month numbering. |
| Day | Yes | 1 to 31 | 5 | Identifies the day of the month. Some calendar systems have irregular number of days. |
| Hour | Yes | 0 to 23 | 5 | Identifies the hour of the day using the 24 hour system. Each day is exactly 24 hours unless it has an irregular length due to daylight saving adjustment. There is no leap seconds. |
| Minutes | Yes | 0 to 59 | 6 | Identifies the minute. Each hour is exactly 60 minutes unless it has an irregular length due to daylight saving adjustment. There is no leap seconds. |
| Second | Yes | 0 to 59 | 6 | Identifies the second. Each minute is exactly 60 seconds. There is no leap seconds. |
| Millisecond | Yes | 0 to 999 | 10 | Identifies millisecond. |
| Microsecond | No | 0 to 999 | 10 | Identifies microsecond. |
| Nanosecond | No | 0 to 999 | 10 | Identifies nanosecond. |

Fig. 3

| Category | Field | Typical range of values | # of bits | Description |
|---|---|---|---|---|
| Timezone | Region | N/A, an ID field | 4 | Identifies a region that the timezone belongs to. Most regions correspond to a continent, as in "America", "Europe" and "Asia". The regions are those defined in the IANA timezone database. Currently 11 regions are present in the database. |
| | Location | N/A, an ID field | 10 | Identifies a timezone in the region. The timezones are those defined in the IANA timezone database. Currently approximately 550 timezones are present across 11 regions are present in the database. |
| Version | Year | 2013 and onwards | 10 | Identifies the year part of the tzdata version. 10 bits support 1K years. |
| | Revision | A to Z | 5 | Identifies the alphabetical revision marker of the tzdata version. |
| Offset | Sign | Positive (ahead of UTC) or negative (behind UTC) | 1 | Identifies whether the offset is ahead of or behind UTC. |
| | Hour | 0 to 14 | 4 | Identifies the hour offset. Some zones have a value greater than 12 |
| | Minute | 0, 15, 30 or 45 | 2 | Identifies the minute offset. Some zones have a non-zero value. |

Fig. 4

DYNAMIC TIME ZONE DEFINITION UPDATE MANAGER

FIELD

One embodiment is directed generally to a computer system, and in particular to a computer system that manages access to and dynamically updates time zone definitions.

BACKGROUND INFORMATION

A time zone is a region on Earth that has a uniform standard time for legal, commercial, and social purposes. It is convenient for areas in close commercial or other communication to keep the same time, so time zones tend to follow the boundaries of countries and their subdivisions.

Most of the time zones on land are offset from Coordinated Universal Time ("UTC") by a whole number of hours (UTC−12 to UTC+14), but a few are offset by 30 or 45 minutes. Some higher latitude countries use daylight saving time for part of the year, typically by changing clocks by an hour. Many land time zones are skewed toward the west of the corresponding nautical time zones. This also creates a permanent daylight saving time effect.

Many countries, and sometimes just certain regions of countries, adopt daylight saving time ("DST", also known as "Summer Time") during part of the year. This typically involves advancing clocks by an hour near the start of spring and adjusting back in autumn ("spring" forward, "fall" back). Modern DST was first proposed in 1907 and was in widespread use in 1916 as a wartime measure aimed at conserving coal. Despite controversy, many countries have used it off and on since then; details vary by location and change occasionally. Most countries around the equator do not observe daylight saving time, since the seasonal difference in sunlight is minimal.

When storing times that may be subject to daylight saving time, the standard time format may be used. Standard time is the result of synchronizing clocks in different geographical locations within a time zone to the same time rather than using the local meridian as in local mean time or solar time. Historically, this helped in the process of weather forecasting and train travel. The concept became established in the late 19th century. The time so set has come to be defined in terms of offsets from Universal Time. Where daylight saving time is used, the term "standard time" typically refers to the time without the offset for daylight saving time.

A government can change the time zone definition at its discretion at any time. A typical example is the expansion of daylight saving time in the U.S. in 2007. In 2006 and earlier, daylight saving time started in the U.S. on the first Sunday in April and ended on the last Sunday in October. Starting in 2007, the daylight saving period has been expanded to start on the second Sunday in March and end on the first Sunday in November. The time of the change remained the same at 2 AM.

For example, it is in the year 2006 and a calendar application has an appointment scheduled for Oct. 31, 2007. The system is based on the rule definition as of 2006 and the scheduled appointment is in the standard time because the rule definition is based on the rules prior to the change in 2007. After the rule change comes into effect, the calendar application may behave unexpectedly because the scheduled time on Oct. 31, 2007 points to an incorrect moment, one hour behind, as it is misinterpreted to be in the standard time.

SUMMARY

One embodiment is a system that manages dynamic time zone definition updates. The system can access stored time zone definitions and receive a subscription request from an application. The system can receive new time zone definitions and, while the application is being executed, update the stored time zone definitions to include the new time zone definitions. The system can then send a notification to the application that the stored time zone definitions have been updated, and the notification can cause the application to resolve impacts, if any, of the time zone definition update while the application continues to be executed.

BRIEF DESCRIPTION OF THE DRAWINGS

FIG. 3 is a table of the format of the time value fields of FIG. 2 in accordance with one embodiment.

FIG. 4 is table of the format of the time zone fields of FIG. 2 in accordance with one embodiment.

DETAILED DESCRIPTION

One embodiment is a system that receives a new version of time zone definitions and dynamically applies the new version of time zone definitions during run-time. Given the new version of time zone definitions and an existing version of time zone definitions, the system identifies one or more impacted periods for each updated time zone. While time zone enabled applications continue to run, the system applies the time zone update and resolves impacts to time values within the impacted periods.

Figure 1:
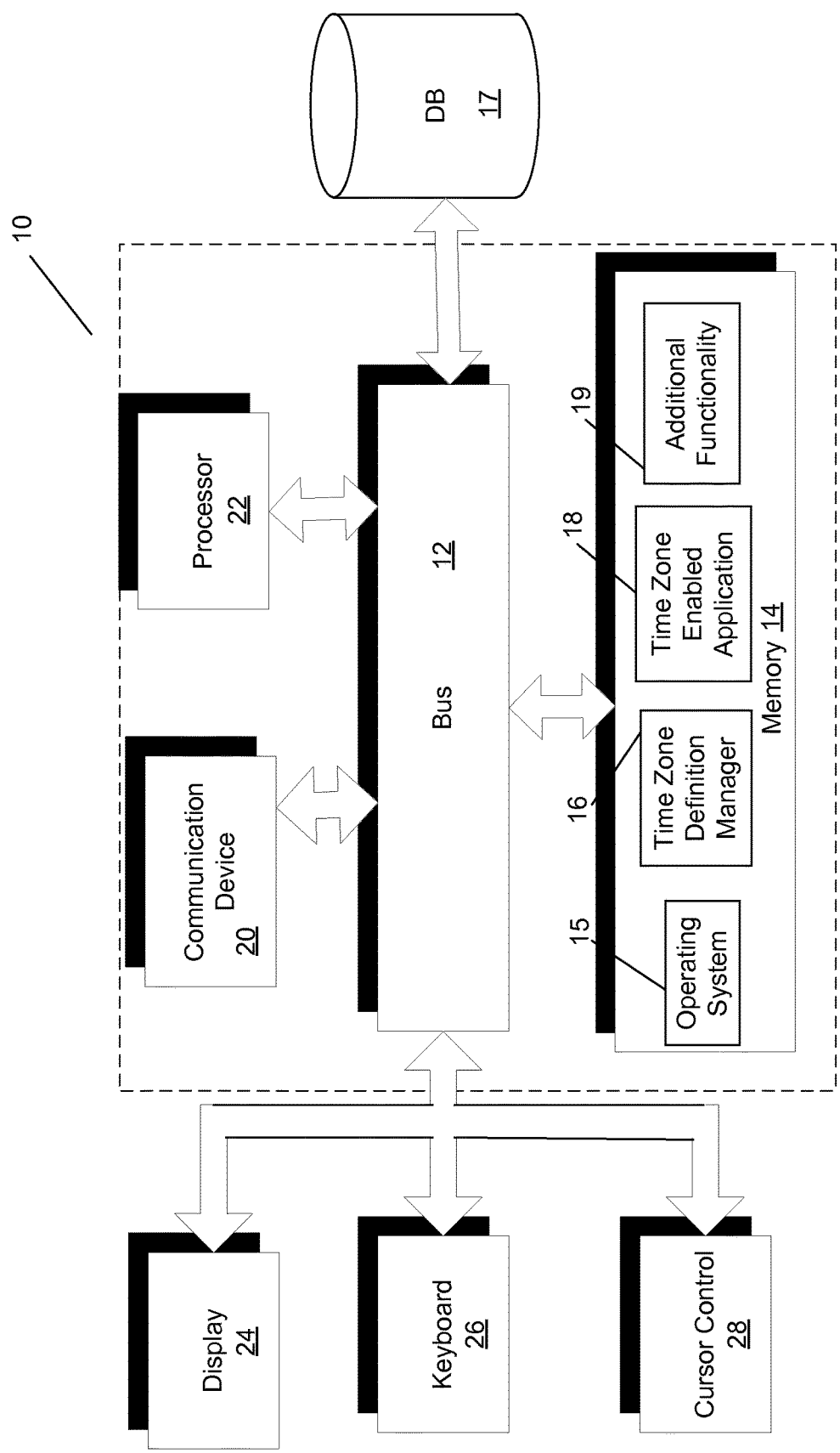
FIG. 1 is a block diagram of a computer system that can implement an embodiment of the present invention.

FIG. 1 is a block diagram of a computer system 10 that can implement an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a time zone definition management module 16 that manages access to and dynamically updates time zone definitions during run-time, as disclosed in more detail below. The modules further include a time zone enabled application module 18 (or time zone enabled application) that interacts with module 16 to enable time zone definition changes during application run-time. Examples of time enabled application 18 include calendar and scheduling applications, high availability applications such as web sites/services and other web-based applications, logistics management system applications, reservation management system applications, project management system applications, etc. System 10 can be part of a larger system, such as an enterprise resource planning ("ERP") system, a database system, a logistics management system, a reservation management system, or a project management system. Therefore, system 10 will typically include one or more additional functional modules 19 to include the additional functionality. A database 17 is coupled to bus 12 to provide centralized storage for modules 16, 18, and 19 and store time information, time zone definitions, etc.

In one embodiment, system 10 receives a new version of time zone definitions and dynamically applies the new version of the time zone definitions during run-time. Given the new version of time zone definitions and an existing version of time zone definitions, system 10 identifies one or more impacted periods for each updated time zone, and resolves the impact of the time zone update for one or more time values within the impacted periods without shutting down, restarting, or entering a maintenance mode. For example, system 10 can be a database system that can apply the new version of the time zone definitions and resolve any impacts of the update while the database system remains available to accept connections from clients/users throughout the process of applying the update and resolving any impacts of the update.

In some embodiments, system 10 receives subscription requests from applications, such as time zone enabled application 18, and receives a new version of time zone definitions. Given the new version of time zone definitions and an existing version of time zone definitions, system 10 identifies updated time zones and one or more impacted periods for each updated time zone. In such an embodiment, system 10 notifies the subscribing applications of the impacted periods so that the subscribing applications can resolve the impact of the time zone update for time values within the impacted periods without having to stop the execution of the applications.

In some embodiments, module 16 can be part of an execution environment in which applications, such as time zone enabled application 18 are executed. For example, a virtual machine, such as a Java virtual machine, can comprise module 16 to manage dynamic time zone definition updates for Java applications being executed by the Java virtual machine. In another example, module 16 can be a part of operating system 15 and can be made available to applications being executed within the context of the operating system 15 by the processor 22.

In some embodiments, time zone definition management module 16 and time zone enabled application 18 are executed by different systems connected to each other via a network, such as a Local Area Network ("LAN"), a Wide Area Network ("WAN"), and/or the Internet. For example, in some embodiments, system 10 is connected via a network to a second system having a second processor and a second memory storing time zone enabled application 18. In such embodiments, time zone enabled application 18 is executed by the second processor and communicates, via the network, with the time zone definition management module 16 being executed by system 10.

Figure 2:
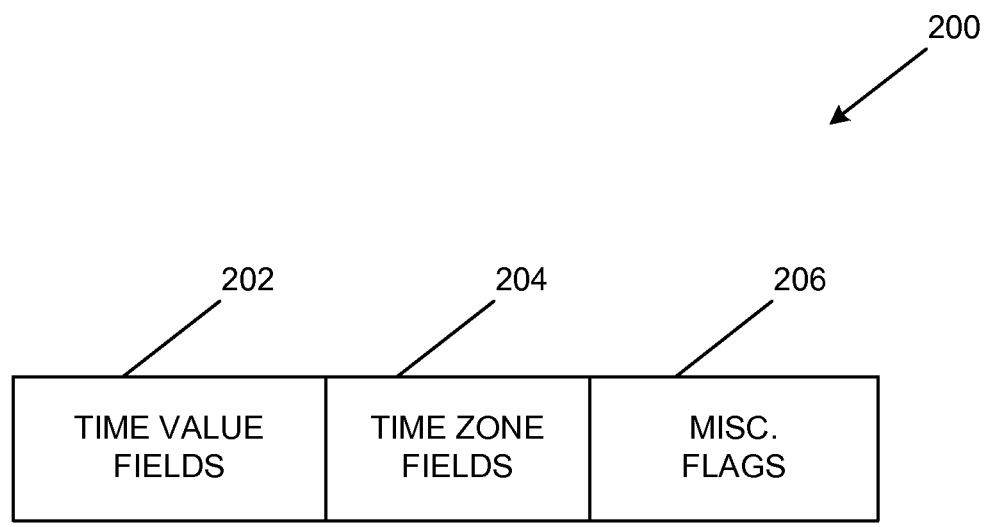
FIG. 2 illustrates a "datetime" data type for representing a time value based on a specific version of a time zone definition in accordance with one embodiment.

FIG. 2 illustrates a "datetime" data type for representing a time value based on a specific version of a time zone definition in accordance with one embodiment. Datetime data type 200 is configured to enable applications, such as time zone enabled application 18 of FIG. 1, to continue execution while time zone definition data is updated and/or to enable systems, such as database systems, to remain available while time zone definition data is updated. Datetime data type 200 can be configured to represent a local time and a specific version of the time zone definition that the local time is based on, as described in FIGS. 3 and 4. Datetime data type 200 provides an advantage of allowing applications/systems to resolve the impacts of time zone definition changes dynamically (e.g., in an online or live manner) which allows the applications/systems to continue being executed/available while time zone definition data is updated and any impacts are resolved.

A "time zone enabled" application, such as time zone enabled application 18, is an application that includes functionality to support time zone definition data being updated while the application is being executed. For example, in some embodiments, time zone enabled application 18 can include functionality that represents time values using datetime data type 200 as described below, and can also include functionality that interacts with time zone definition management module 16 to receive notifications when time zone definition data is updated and/or temporality prevent time zone definition data updates, as described in FIGS. 9A and 9B below.

In embodiments, datetime data type 200 includes three types of fields: time value fields 202, time zone fields 204, and miscellaneous fields 206.

Time value fields 202 collectively identify the specific instant. Time value fields 202 can include a basic set of fields such as the following:

Year
Month
Day
Hour
Minute
Second
Millisecond.

These basic fields support the most common scenarios. In embodiments, the definitions of each field is consistent with the International Organization for Standardization ("ISO") 8601 standard.

Time value fields 202 can include an advanced set of value fields in addition to the basic fields, such as:

Era

Proleptic Year

Microsecond

Nanosecond.

The advanced fields are not commonly used but may be used in some scenarios.

The era field identifies a specific era in the given calendar system. For example, the Gregorian calendar has two eras: the Common Era ("CE") and Before the Common Era ("BCE").

The proleptic year field identifies a contiguous year of all time as opposed to the year field that identifies a year of era. For example, in the Japanese imperial calendar, year of era is reset to 1 at the beginning of a new era. The Gregorian year provides a proleptic year number that can identify the year unambiguously without identifying the era.

The microsecond and nanosecond fields provide the ability to support extra precision.

Time zone fields 204 identify the specific local time zone and time zone definition version upon which the local time of time value fields 202 is based. Time zone fields 204 can include the following fields:

Time zone ID

Time zone data version.

Time zone ID identifies a specific time zone, such as a time zone registered at the Internet Assigned Numbers Authority ("IANA") time zone database. The standard time zone naming scheme uses two parts. One part is for a region and the other is for the specific zone identified with an exemplar city. For example, "America/Los_Angeles" for the US Pacific time zone. As of the third release of the IANA time zone definition database in 2013, the IANA time zone definition database includes 548 time zones across 11 regions.

Time zone ID may identify an unnamed zone that is identified with a UTC offset alone. The naming scheme for such zones is different from that of named zones and uses three parts: the sign to indicate whether the time is ahead of or behind UTC, the hour offset, and minute offset. For example, "+0900" for 09 hours and 00 minutes ahead of UTC.

Time zone data version indicates which version of the time zone definition data that the specific local time instant identified by time value fields 202 is based on. The IANA time zone database is one source of time zone definitions and every IANA release has a revision identifier consisting of the year of release and an alphabet letter sequentially assigned from the first release in the year. For example, "tzdata2013a" is the first release in the year 2013 and this release is followed by "tzdata2013b".

An advantage of embodiments is that by referencing the time zone definition data version upon which the local time of time value fields 202 is based, time zone definition data can be updated to include new versions while applications, such as time zone enabled application 18, and/or systems, such as a database system, can continue execution without stopping, shutting down, or restarting and without entering a maintenance mode. Embodiments can update time zone definition data with new versions in such a dynamic manner (e.g., remaining online) while maintaining time zone definition data integrity/consistency by performing functionality, such as that described in FIGS. 5-9 below.

In some embodiments, datetime data type 200 can include additional fields representing the local time converted to a corresponding UTC time. An advantage of such embodiments is that comparing datetime values (time values represented using datetime data type 200) to other time values (including other datetime values) is optimized because the corresponding UTC time is not calculated every time a datetime value is compared to another time value. In such embodiments, the corresponding UTC time may become out of date ("dirty") after time zone definition data is updated, and some embodiments may be further optimized to update the dirty corresponding UTC times in a "lazy" manner (e.g., when a comparison is performed after a time zone update is applied that impacts the datetime value). In some embodiments, the corresponding UTC time is calculated as needed (e.g., for each comparison) and is not included in datetime data type 200. In some embodiments dirty corresponding UTC times are not updated because the correct corresponding UTC time can be determined from the local time and the version of the time zone definition that the local time is based upon.

Miscellaneous flags 206 can include:

Determinate flag

DST flag

Overlapping flag.

The determinate flag indicates whether the mapping between the local time represented by time value fields 202 and the corresponding UTC time is final. The mapping between local time and UTC may change if the time zone definition changes, so the mapping is not final while the chance of a change of time zone definition exists. Embodiments use the determinate flag to optimize the identification of corresponding UTC time values that may need to be updated after time zone definition data is updated. Once the mapping between the local time represented by time value fields 202 and the corresponding UTC time is final, the determinate flag can be set so that the datetime value can be quickly identified as not requiring an update after any future time zone definition data updates.

In some embodiments, if the local time identified by time value fields 202 is in the past the determinate flag is set, otherwise it is not set.

In some embodiments, an unset determinate flag may get serialized and stored but when it is loaded back, the flag may be incorrect because it may be loaded back at a later time. Therefore, in some embodiments, this flag can be evaluated and reset as necessary, such as at the time of deserialization. For example, it may be appropriate to set the flag when a saved value is deserialized, if the local time is in the past at the time of deserialization.

In embodiments in which the determinate flag is set based on comparing the local time to the present time, a delay in applying a new time zone definition data update may affect the accuracy of datetime values because the current time zone definition data may be out of date until the new time zone definition data update is applied. In some embodiments, a buffer of time from the present time can be used to avoid this possible synchronization problem. For example, a 48 hour buffer can be used by some embodiments to assure correct processing if the new time zone definition data update is applied within 48 hours of when the update was to be effective. In such embodiments, the determinate flag is not set until the present time is at least 48 hours after the local time of the datetime value. An advantage of such embodiments is that although an out of date version may be in use, it is very common for a value to be created from the current time and therefore the chance of incorrect flagging would be low.

Some embodiments can ensure the accuracy of datetime values in which the determinate flag is set based on comparing the local time to the present time by requiring that new time zone definition data updates are applied before the corresponding time zone changes are to be effective. For example, in some embodiments correct processing can be assured if the new time zone definition data is applied with a buffer of at least 48 hours before the update will become effective. By applying the update in advance, the chance of incorrectly setting the determinate flag can be reduced, and the larger the buffer, the smaller the chance of incorrectly setting the determinate flag. Some embodiments may not include a buffer larger than 48 hours because governments can announce time zone definition changes that are to become effective within a short period of time (e.g., within a week) and no change of impact can be larger than 48 hours. The change of impact is typically one hour and can be as large as 24 hours. For example, Samoa moved from just east of the International Date Line ("IDL") to west of the IDL and advanced 24 hours at midnight of Dec. 29, 2011 (i.e., there is no Dec. 30, 2011 in Samoa).

The DST Flag indicates whether the local time represented by time value fields 202 is in the daylight saving period. The value may change if time zone definition data is updated.

The Overlapping Flag indicates whether the local time represented by time value fields 202 is in the overlapped window of time that occurs at the end of a daylight saving period. When the clock is adjusted backward, for the duration of the amount of saving (usually an hour), the time value represented by the field values becomes ambiguous as to whether it represents the standard time or DST. In a combination with the DST flag, the overlapping flag can eliminate the ambiguity and enable embodiments to disambiguate whether a value in the overlapped period refers to the standard time or DST. The value may change if time zone definition data is updated.

FIG. 3 is a table of the format of time value fields 202 of FIG. 2 in accordance with one embodiment. In some embodiments, an alternative approach using an incremental count of a small duration of time such as a millisecond from an epoch where a value of zero can be used to represent the specific moment that serves as the base. For example, JavaScript and Java use the midnight of Jan. 1, 1970 in UTC. In such embodiments, increasing millisecond counts represents the subsequent milliseconds and combining this number with the time zone definition data enables the embodiments to identify any instant within the supported range of time in any supported time zone.

FIG. 4 is table of the format of time zone fields 204 of FIG. 2 in accordance with one embodiment. Some embodiments require the time zone category fields. In some embodiments the fields in the version category are not required but are desired for an optimization purpose. Embodiments including a corresponding UTC time and requiring these fields can be optimized because the fields in the version category and the corresponding UTC time can be used to compare values from different time zones without performing the otherwise required time zone conversion to align to the same time zone.

Embodiments can use the fields in the offset category for an unnamed time zone with the UTC offset only. In some embodiments the offset category fields may be a part of the time zone category and these fields can use the same physical space used by the time zone category fields. For example, there can be a marker bit or time zone ID to indicate that the time zone is offset based and the offset fields can be in place of the space used by the time zone ID values (e.g., a null in the region bits and the offset fields inside the 10 bits normally taken by the location field). Embodiments do not require UTC offset version identification because the UTC offsets are permanently fixed.

Figure 5:
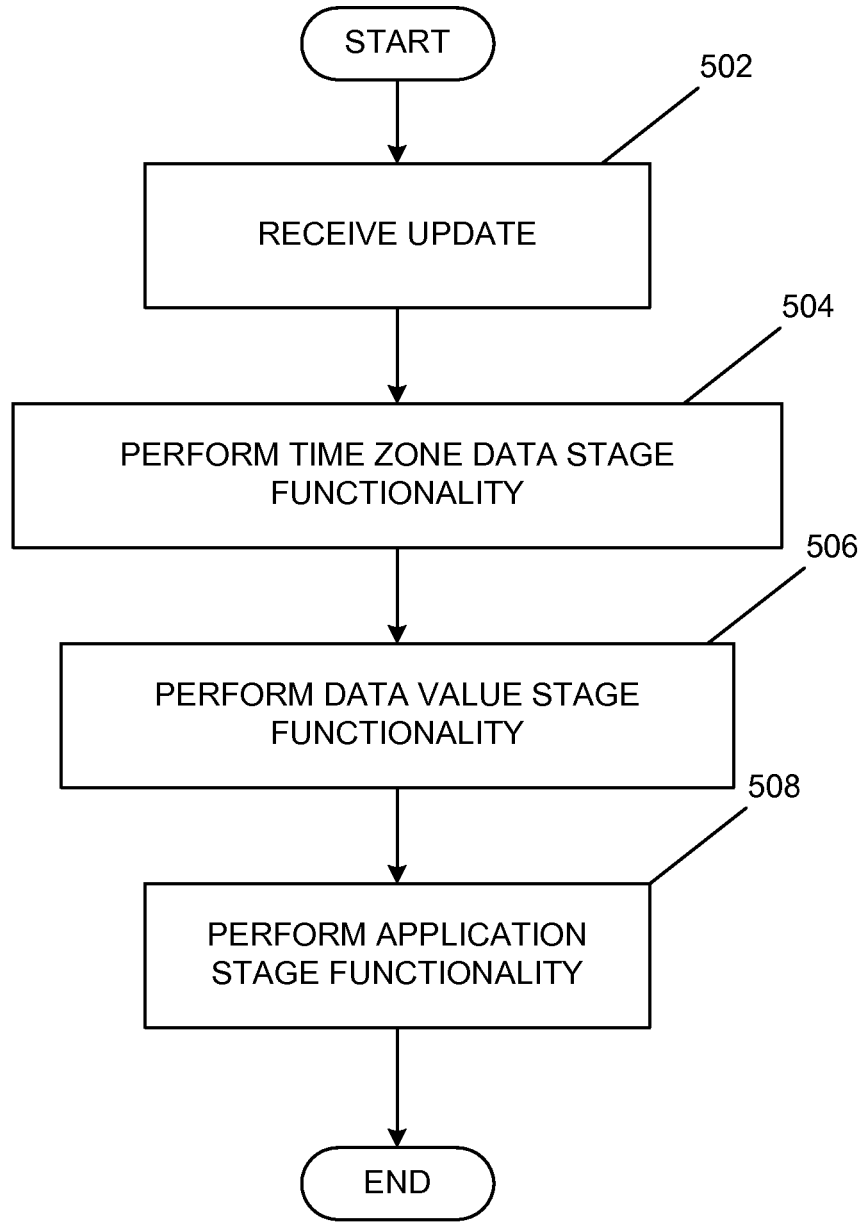
FIG. 5 is a flow diagram showing the functionality for dynamically updating time zone definitions in accordance with one embodiment.

FIG. 5 is a flow diagram showing the functionality for dynamically updating time zone definitions in accordance with one embodiment. In one embodiment, the functionality of the flow diagrams of FIG. 5 and FIGS. 6-8 below, and the sequence diagram of FIGS. 9A and 9B below, are implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 502, module 16 receives a new time zone definition data update. In some embodiments, the time zone definition data update can be received as a file, such as an IANA time zone definition data file.

At 504, module 16 performs Time Zone Data Stage functionality to identify the updated time zones and impacted time periods. An example of Time Zone Data Stage functionality is described in FIG. 6 below.

At 506, module 16 and/or application 18 perform Value Stage functionality to determine the time values that may be impacted by the time zone definition data update. An example of Value Stage functionality is described in FIG. 7 below.

At 508, module 16 and/or application 18 perform Application Stage functionality to resolve the impact of the time zone definition data update. An example of Application Stage functionality is described in FIG. 8 below.

In some embodiments, 502-508 occur in the numbered sequence. However, in some embodiments, 504 for some time values may occur after 506 has been completed for other values. In embodiments, time zone enabled applications can define strategies to determine the impact on values and resolve them accordingly. For example, time zone enabled applications may complete 506 for all time values first and then proceed to 508, or interleave 506 and 508 by beginning 508 as soon as 506 finds an impacted time value and before finding all impacted values.

An advantage of embodiments is that datetime data type 200 of FIG. 2 correctly identifies any instant in the local time zone even if the time zone definition has changed, by representing the time value fields 202 in local time with an identifier of the time zone definition version that the local time is based on (time zone fields 204), and these fields do not require updating when time zone definition data is updated. As described above, some embodiments can be optimized by including a mapping of the local time to a corresponding UTC time in datetime data type 200, which can be used for comparing different instances of datetime data type 200 more efficiently because comparisons of the corresponding UTC times can be performed without having to convert the local times across time zones. In such embodiments, the UTC time corresponding to the local time may need to be updated after an update to the time zone definition data if the local time is within an impacted period of time, as described below. However, even if the local time is within an impacted period, the local time (e.g., time value fields 202) and the identifier of the time zone definition version that the local time is based (e.g., time zone fields 204) on do not require updating.

In some embodiments, system 10 is a database system that can represent datetime values using datetime data type 200 and can dynamically apply time zone definition data updates and resolve impacts of the updates while the database system remains available. In such embodiments, the database system can apply the updates without updating, as described above, the time value fields 202 and time zone fields 204 of the datetime values. In such embodiments, the database system can determine an updated corresponding UTC time (which can be included in datetime data type 200 and can be updated when dirty, or determined by the database system as needed) for datetime values within periods of time impacted by the time zone definition update. In such embodiments, while the database system remains available, the database system can determine the updated corresponding UTC times when the impacted datetime values are accessed, when they are compared to other time values (including other datetime values), or in a batch process after the update is applied. In such embodiments, the database system can determine which datetime values are impacted and may have a dirty corresponding UTC time by performing, for example, some or all of the functionality shown in FIG. 7. In some of such embodiments, the database system provides support for time zone enabled applications, such as application 18 of FIG. 1, by performing the Time Zone Data Stage, Value Stage, and other functionality shown in FIGS. 5-8, 9A, and 9B below.

Figure 6:
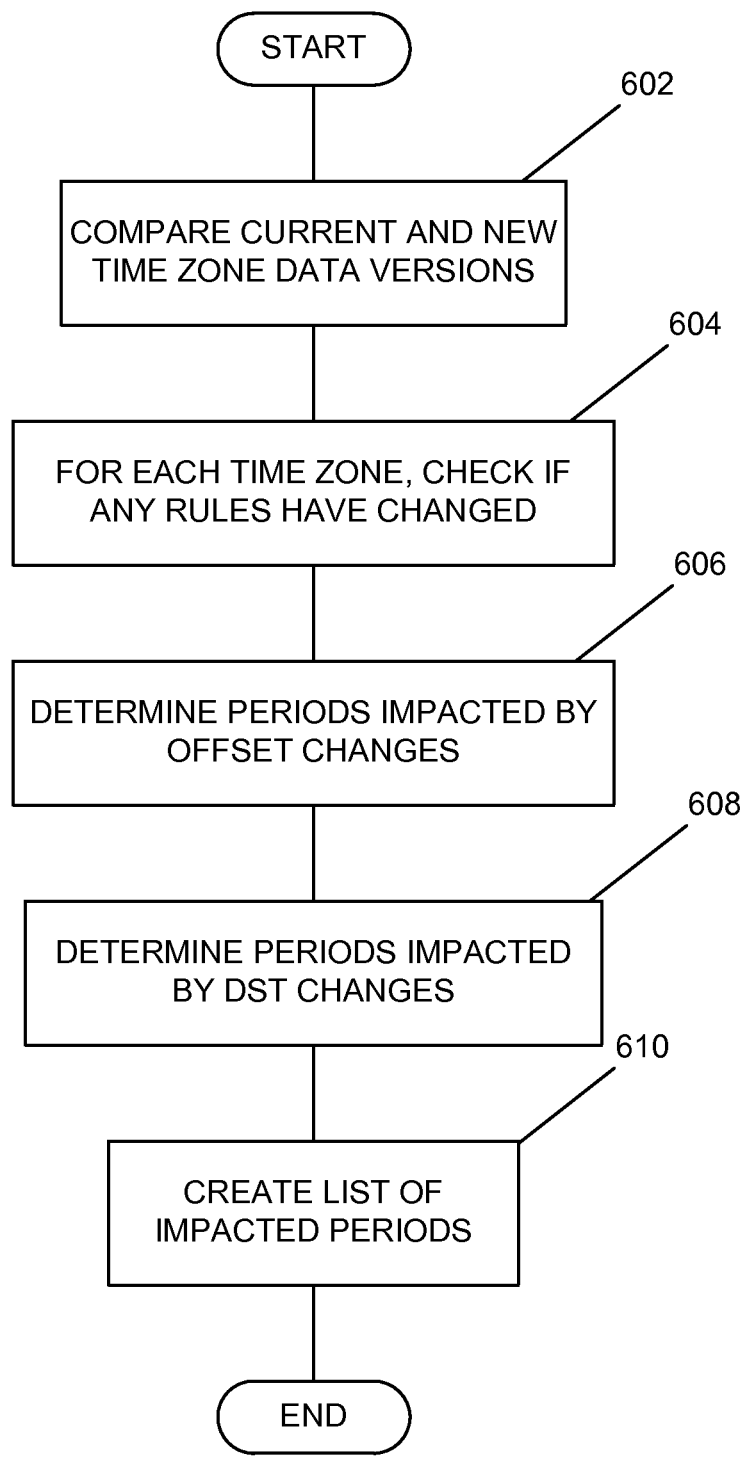
FIG. 6 is a flow diagram of the Time Zone Data Stage functionality in accordance with one embodiment.

FIG. 6 is a flow diagram of Time Zone Data Stage functionality in accordance with one embodiment. The functionality of FIG. 6 identifies periods impacted by a time zone definition data update and when the periods of impact begin and end.

At 602, module 16 compares the current and new time zone definition data versions.

At 604, for each time zone, module 16 performs an analysis to determine if any time zone definition rule has changed.

At 606, module 16 determines whether the UTC offset has changed and if so determines that the impact period starts at the moment of the effective date and time of the new time zone definition data version. For example, as described above, the UTC offset of Samoa changed from 12 hours behind UTC to 12 hours ahead of UTC on Dec. 29, 2011 at midnight, and the corresponding impact period would start at midnight of Dec. 29, 2011, the effective date and time of Samoa's UTC offset change.

At 608, module 16 determines whether the DST rules have changed and if so compares the start and end dates to determine the periods of impact. For example, Israel changed to its DST rules in 2013 to extend the DST end date in October 2013. According to the prior rules, Israel's DST for 2013 was to end on October 6, the first Sunday after October 1, at 2:00 AM. With the updated rule, Israel's DST was extended to end on October 27, the last Sunday in October, at 2:00 AM. A period of impact for this example would be from Oct. 1, 2013, at 2:00 AM to Oct. 27, 2013, at 2:00 AM.

At 610, module 16 creates a list of impacted periods for each updated time zone, each impacted period having a start and end date and time and an old and new UTC offset.

In some embodiments, optimizations to the functionality of FIG. 6 can be applied such as reducing the set of time zones available in the system.

In some embodiments, the list of impacted periods for each updated time zone is provided to time zone enabled applications that have subscribed to receive update notifications, as shown below in FIG. 9A. For example, the list of impacted periods can be included in the update notification provided to the running time zone enabled applications.

Figure 7:
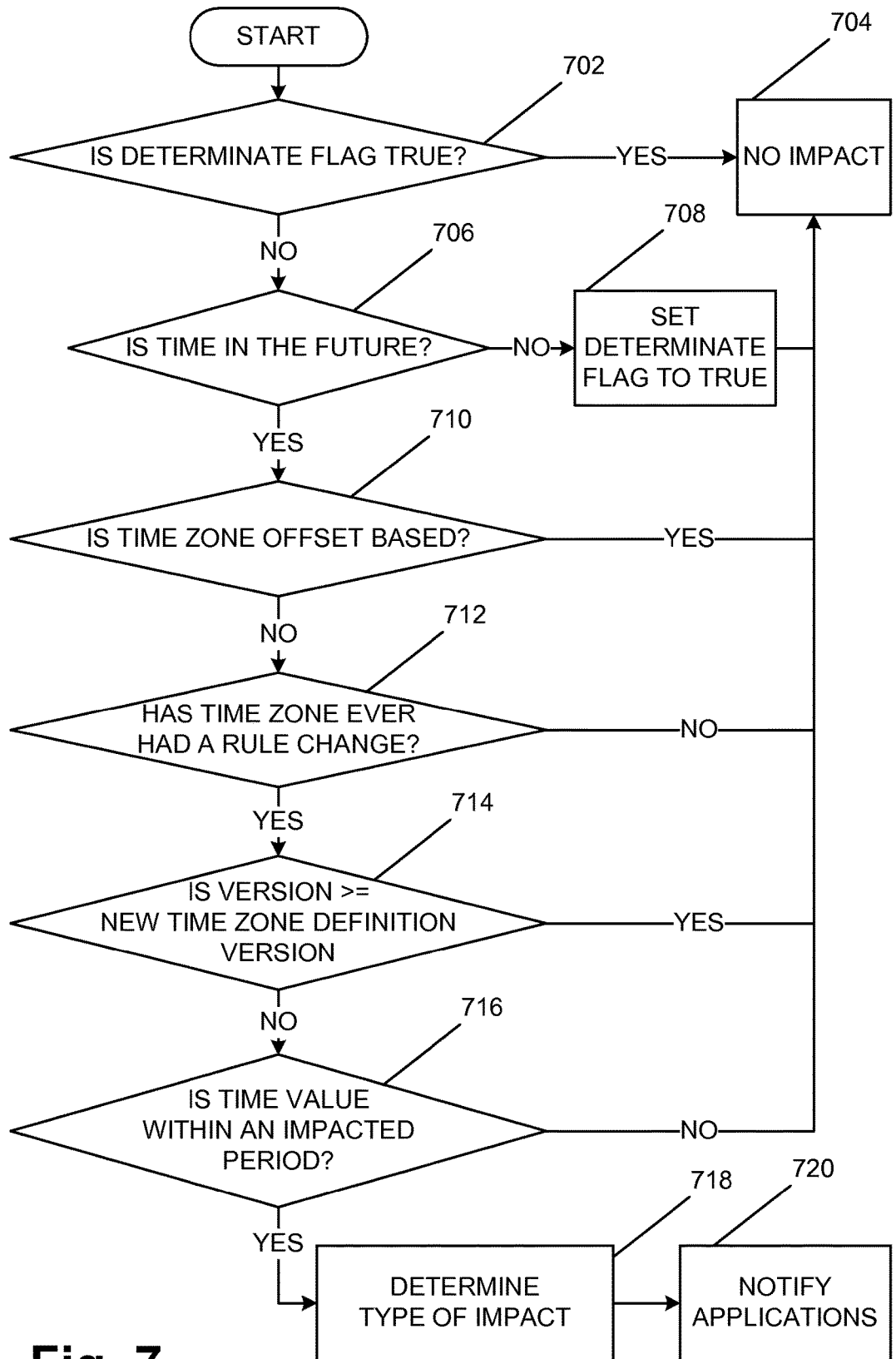
FIG. 7 is a flow diagram of the Value Stage functionality in accordance with one embodiment.

FIG. 7 is a flow diagram of the Value Stage functionality in accordance with one embodiment. The functionality of FIG. 7 identifies datetime values (represented by datetime data type 200 of FIG. 2) that are within the periods of impact of a time zone definition data update and therefore may need one or more actions to be performed to resolve the impact. Embodiments can optimize the execution of the Value Stage functionality by executing the "inexpensive" tests first that would exclude most values from the relatively more "expensive" tests which can be performed later.

At 702, module 16 determines whether the determinate flag is set (i.e., is true). If the determinate flag is set functionality continues to 704 where module 16 determines that there is no impact to the datetime value. If the determinate flag is not set (i.e., is false) functionality continues to 706.

At 706, module 16 determines whether the datetime value is in the future by comparing the current time and the datetime value in UTC. If the time is not in the future, functionality continues to 708 where the determinate flag is set to true and functionality continues to 704. Otherwise, functionality continues to 710.

Some embodiments may perform additional checks when determining whether to set the determinate flag. For example, some embodiments can set the determinate flag when the datetime value is not in the future and when there were no time zone updates between the local time in UTC and the effective date of the time zone version that the local time is based on. Some embodiments may not require additional checks if the impact to be resolved should be resolved ahead of time. For example, in some calendar applications an impact to a scheduled meeting time should be resolved ahead of time because if the impacted scheduled meeting time (and/or the corrected time) is in the past, then the meeting has already occurred and it may be too late to resolve the impact or a resolution may no longer be useful. In some embodiments, a buffer of time is used to set the determinate flag, as described hereinabove, and in some such embodiments the buffer can be equal to or larger than the largest possible impact such that the determinate flag is not set until a datetime value is far enough in the past that it cannot be adjusted into the future by a time zone dentition change.

At 710, module 16 determines whether the time zone is an offset based region. If so, functionality continues to 704, otherwise functionality continues to 712.

At 712, module 16 determines whether the time zone has ever had a rule change. If there has never been a rule change for the time zone, functionality continues to 704, otherwise functionality continues to 714.

At 714, module 16 determines whether the time zone definition version field is equal or greater/newer than the last version on which the rule definition was last updated for the time zone. If the version is equal or newer than the last version, functionality continues to 704, otherwise functionality continues to 716.

At 716, module 16 determines whether the datetime value is within a period of impact. If so, functionality continues to 718, otherwise functionality continues to 704.

Figure 8:
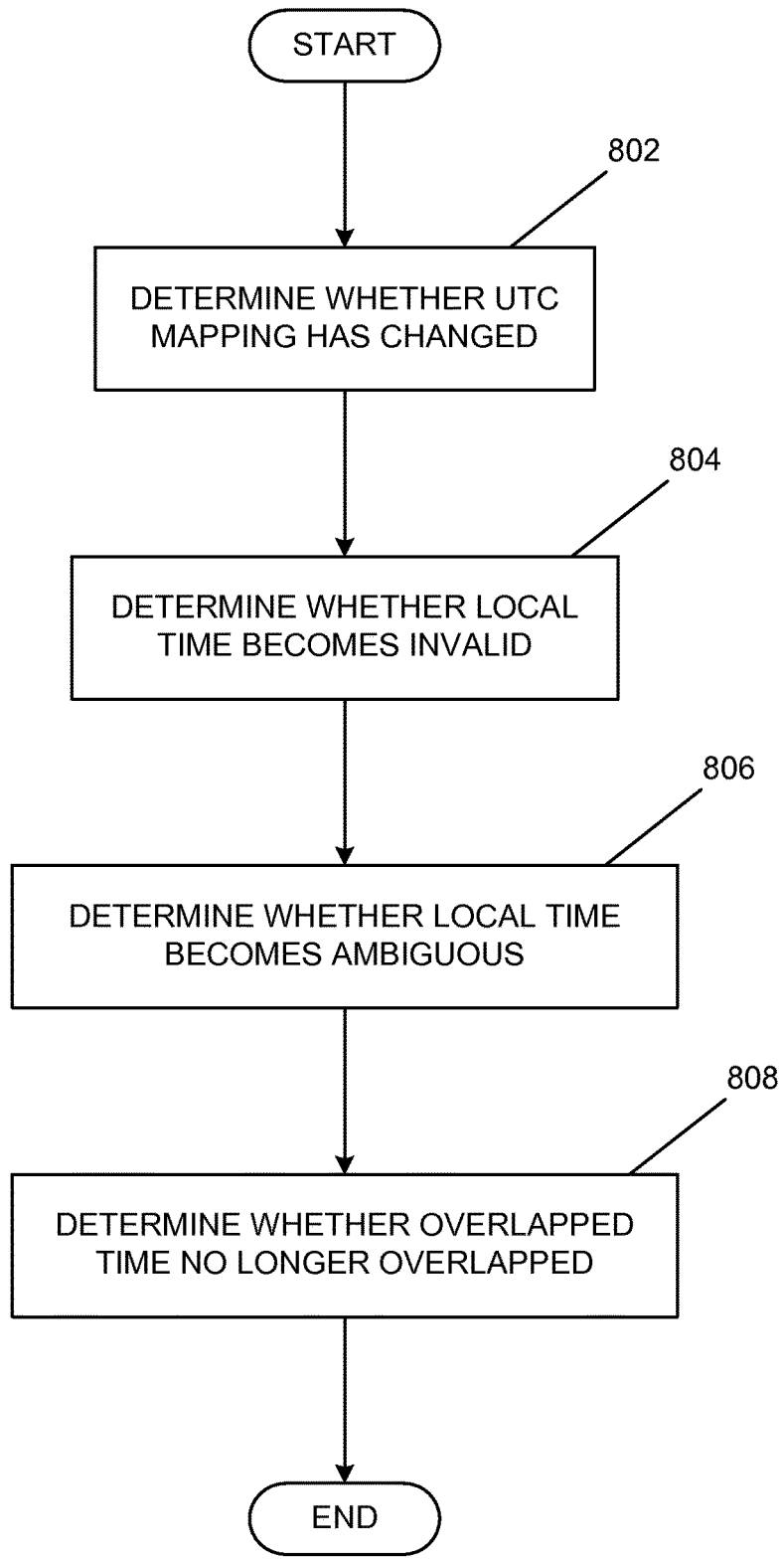
FIG. 8 is a flow diagram of the functionality for determining types of impact created by time zone definition updates in accordance with one embodiment.

At 718, module 16 determines the type of impact that applies to the datetime value. An example of this functionality is shown in FIG. 8 below.

At 720, module 16 sends a notification to time zone enabled applications that had previously subscribed for update notifications. An example of this functionality is shown in FIGS. 9A and 9B below.

Figure 9A:
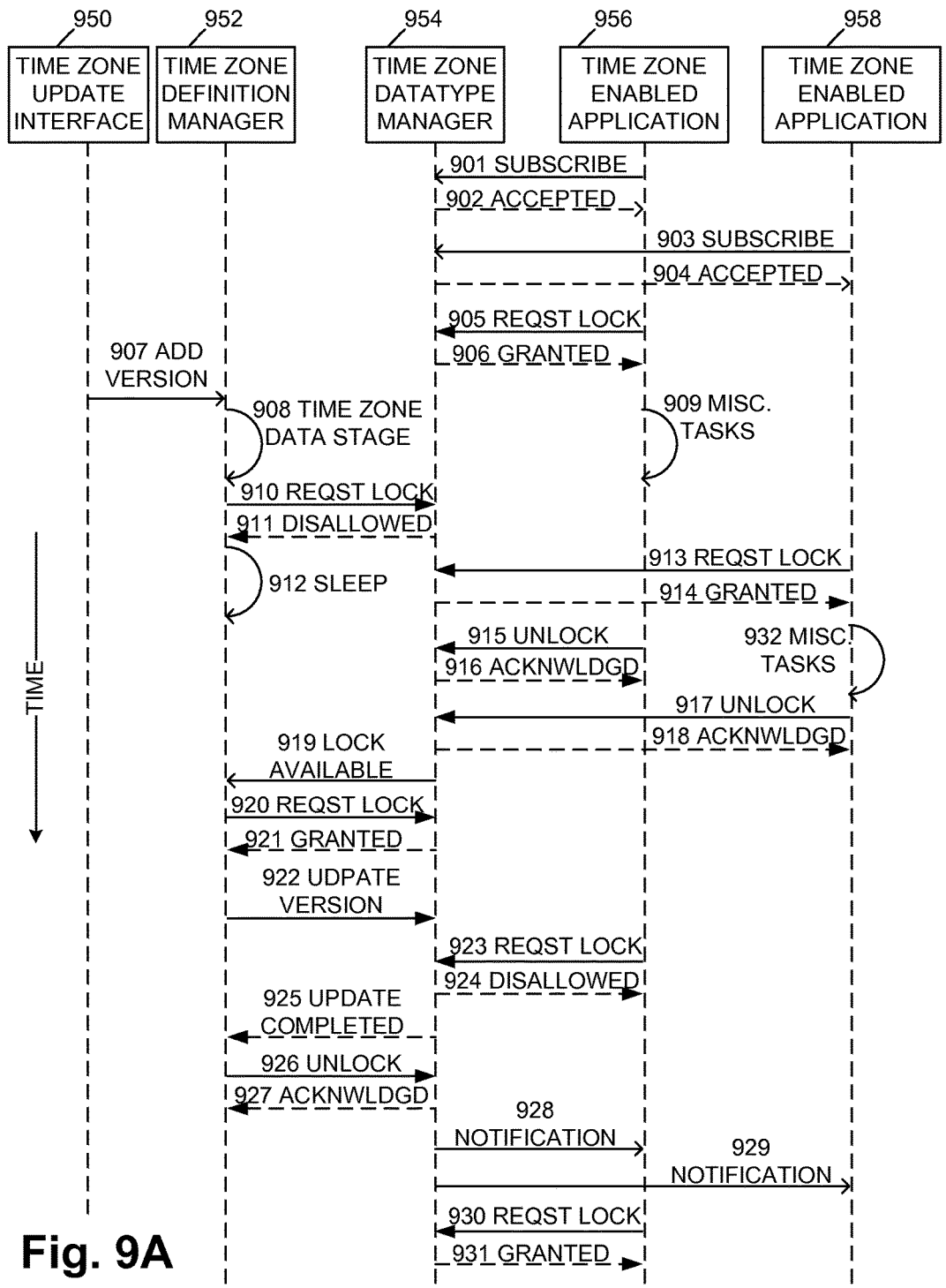
FIGS. 9A and 9B are sequence diagrams of functionality of the time zone definition management module and the time zone enabled application of FIG. 1 in accordance with one embodiment.
Figure 9B:
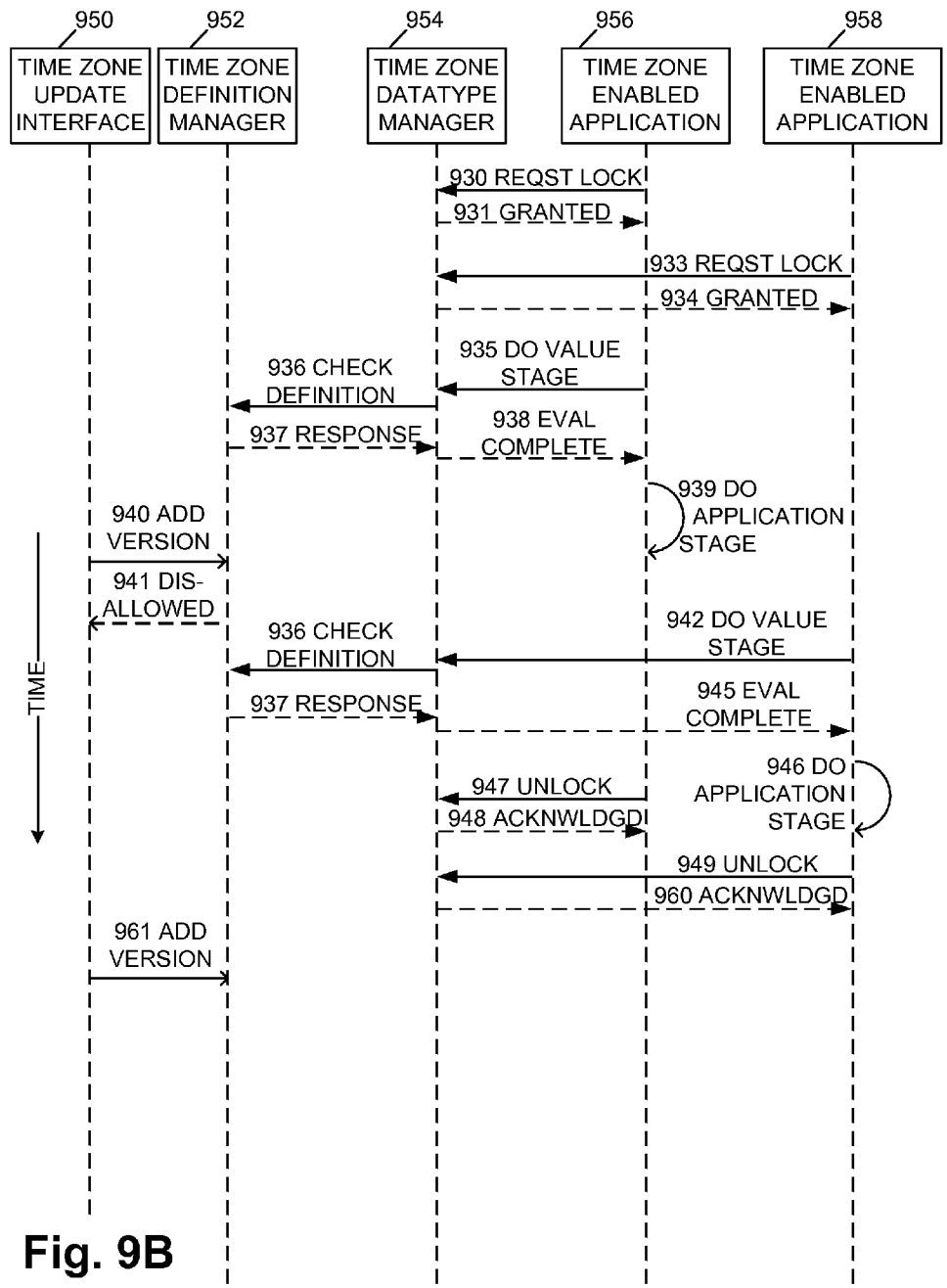

In some embodiments, time zone enabled applications, such as application 18 of FIG. 1, can send a request including time values to be evaluated to module 16 to perform some or all of the functionality of 702-718 for the requested time values after the time zone enabled application is notified that the time zone definition data has been updated, as shown in FIGS. 9A and 9B below.

In some embodiments, module 16 can perform functionality to determine a list of impacted periods, such as the functionality shown in FIG. 6 above, and then perform the functionality shown at 718 above and in FIG. 8 below to determine the types of impact for times within each impacted period. In such embodiments, update notifications sent to subscribing time zone enabled applications, such as those notifications shown in FIGS. 9A and 9B below, can include the list of impacted periods and the types of impact determined for each impacted period. In embodiments, the time zone enabled applications can resolve the impacts, if any, of time zone updates based on the list of impacted periods and the types of impact determined for each impacted period included in the update notifications.

FIG. 8 is a flow diagram of functionality for determining types of impact created by time zone definition updates in accordance with one embodiment. Embodiments can determine one or more types of impact caused by a time zone definition data update that a time zone enabled application may wish to handle, such as UTC mapping changes, invalid local time, ambiguous local time, and/or overlapping time status changes.

At 802, module 16 determines whether the UTC mapping has changed. For example, this type of impact may be of interest to a scheduling application, such as a calendar application. When the UTC mapping changes, the actual absolute time in UTC that corresponds to the local time has changed. A calendar application can resolve the impact of such a change on a scheduled appointment within an impacted period by moving it to the correct time that matches the new definition.

At 804, module 16 determines whether the local time has become invalid. The local time can become invalid if it is in the gap at the beginning of a daylight saving period. For example, in the U.S. there is a gap at 2:00 AM for one hour and local times that are within this gap are invalid. In some embodiments, time zone enabled applications can provide their own strategy to resolve this condition.

At 806, module 16 determines whether the local time has become ambiguous. The local time could become ambiguous if it is in the overlapped period at the end of a daylight saving period. For example, in the U.S. there is an overlap at 2:00 AM for one hour during which the datetime value must be clarified if it is in the standard time or in DST. In some embodiments, time zone enabled applications can provide their own strategy to resolve this condition.

At 808, module 16 determines whether an overlapped time becomes no longer overlapped. A local time in the overlapped DST adjustment period could become no longer overlapped if the end of a daylight saving period is changed. In some embodiments, a time zone enabled application can handle this condition. For example, if every minute in a two hour overlapped period had a value for a total of 120 of them and the overlap has moved away, the application can specify how the 120 values should be fit in the shorter one hour period. Time zone enabled applications can be configured to resolve this type of impact in various ways.

In some embodiments, functionality 802-808 can be performed to determine the types of impact for a given datetime value, as described above at 718 in FIG. 7, in addition to or in place of determining the types of impact for each impacted period as described above.

As discussed above, a time zone enabled application, such as application 18 of FIG. 1, can be configured to resolve impacts, such as those described above, that are created when time zone definition data is updated. For example, embodiments can perform Application Stage functionality to resolve the impacts as described below.

In the Application Stage, time zone enabled applications can perform actions to handle impacts on datetime values. For each impact, time zone enabled applications can examine the type of impact, field values such as time value fields 202 and time zone fields 204 of FIG. 2 and the condition flags such as miscellaneous flags 206 of FIG. 2 to determine the appropriate actions to resolve the impact.

For example, a time zone enabled calendar application may need to respond to a changed UTC mapping because some participants of a scheduled event in a different time zone may need to be notified. Participants in the same time zone may not realize the change, but those in other time zones may find the appointment in their local time zone shifted forward or backward due to the impact. The shift could create a scheduling conflict that may need to be resolved, so the application may need to perform functionality to resolve the impact.

FIG. 9A is a sequence diagram of functionality of time zone definition management module 16 and time zone enabled application 18 of FIG. 1 and provides an example time zone update scenario in accordance with one embodiment.

Transitioning from the current time zone definition data version to an updated time zone definition data version can create consistency issues if access and updates to time zone definition data are not properly controlled. For example, two datetime values with exactly the same time zone ID field and with exactly the same time value fields 202 but with different time zone definition version fields are not necessarily evaluated as equal and may cause unexpected behavior. Time zone enabled applications being executed may often require stability of the time zone definitions as they perform a number of related operations on datetime values such as sorting a set of records. For example, an application may sort a set of records in a chronological order by comparing the timestamps on the records. In this example, if inconsistent time zone definition data versions are used in evaluating the timestamp values, the sorting results may be incorrect.

In some embodiments, module 16 can include a time zone update interface 950, a time zone definition manager 952, and a time zone time zone datatype manager 954 to allow for updates and to protect the consistency/integrity of time zone definition data versions. Some embodiments allow applications to "lock" the time zone definition data to ensure consistency/integrity of time zone definition data. While the time zone definition data is "locked," it is guaranteed that an update of time zone definition data will not occur. An update can only happen when no application has a lock, in one embodiment.

In embodiments, applications continue running while a new time zone definition data version is published anytime, and the Time Zone Data Stage functionality of FIG. 6 can be performed on the new time zone definition data version while an existing time zone definition data version continues to be used by applications in the execution environment. In some embodiments, time zone definition data updates are kept private and not exposed to applications in the execution environment until time zone definition manager 952 acquires a "lock" and publishes the updates to applications. In some embodiments, module 16 can include time zone update interface 950 to allow administrators to manage the time zone definition data. In some embodiments, the time zone definition data is stored in a repository ("time zone data repository"), such as database 17.

FIGS. 9A and 9B provide arrows with straight lines to indicate the communication between the objects (e.g., arrow 901), and arrows with curved lines to represent internal processing (e.g., arrow 908). A solid arrow with a solid line indicates a synchronous message that cannot be interrupted until it completes processing and a return message is sent back (e.g., arrow 905). Return messages are indicated with a solid arrow with a dotted line (e.g., arrow 906).

As discussed above, in some embodiments, module 16 provides dynamic time zone definition management for execution or runtime environments. In some embodiments, module 16 provides such functionality through time zone update interface 950, time zone definition manager 952, and time zone time zone datatype manager 954, each of which are components of module 16 that can be integrated with an execution or runtime environment.

At 901, time zone enabled application 956 subscribes by sending a request to time zone datatype manager 954 to notify it when a new version of time zone definition data becomes available.

At 902, time zone datatype manager 954 acknowledges the request and records a callback entry to time zone enabled application 956 that had been provided in the request.

At 903, time zone enabled application 958 requests the time zone datatype manager 954 to notify it when a new revision of time zone definition data becomes available.

At 904, time zone datatype manager 954 acknowledges the request and records a callback entry to time zone enabled application 958 that had been provided in the request.

At 905, time zone enabled application 956 requests a lock before it performs a task with a set of operations during which it does not want the time zone definition data version used in the execution environment to change.

At 906, time zone datatype manager 954 acknowledges the lock request and issues a lock to time zone enabled application 956. The lock assures time zone enabled application 956 that the time zone definition data version used in the execution environment will not be updated while it holds the lock.

At 907, a request to add a new time zone definition data version is made on time zone update interface 950 which sends the request to time zone definition manager 952. In some embodiments, this is an invocation of a time zone management API provided by module 16 and made available in the execution environment. In some embodiments time zone update interface 950 is a user interface such as a command line tool that is configured to perform management tasks to deal with time zone definition data versions. In some embodiments, the add new time zone definition data version request can be accepted by time zone definition manager 952 anytime, as long as time zone datatype manager 954 has completed the updates for any previous versions (submitted for example via a previous request). In such embodiments, if processing for a previous version is incomplete, the request is denied.

At 908, the new time zone definition data version is examined to identify the changes from prior versions available in the time zone definition data. For example, Time Zone Data Stage functionality, such as that described in FIG. 6, can be performed by time zone definition manager 952. These activities are not exposed to applications and none of the new time zone definition data and the data newly generated in the Time Zone Data Stage affects subscribing applications at this point. In some embodiments, the new time zone definition data version is added to a private portion of the time zone data repository prior to being compared against previous versions.

At 909, time zone enabled application 956 performs miscellaneous tasks. As it has acquired the lock, the tasks are assured to be processed based on a consistent time zone definition data version.

At 910, time zone definition manager 952 requests a lock as it completes performance of Time Zone Data Stage functionality. Time zone definition manager 952 obtains a lock before it makes the new time zone definition data version available in the execution environment.

At 911, time zone datatype manager 954 denies the lock request as a lock has been issued to time zone enabled application 956 and the lock is still in effect.

At 912, time zone definition manager 952 enters a waiting state as it is not yet allowed to make the new time zone definition data version available.

At 913, time zone enabled application 958 requests a lock before it performs a task with a set of operations during which it does not want the time zone definition data version to change.

At 914, time zone datatype manager 954 acknowledges the lock request and issues a lock to time zone enabled application 958. This lock assures time zone enabled application 958 that the time zone definition data version will be consistent while it holds the lock.

In embodiments, the lock is not exclusive among applications. Any number of applications being executed may hold a lock at the same time. A lock request from an application is granted unless time zone definition manager 952 has a lock, and a request by time zone definition manager 952 is granted only when none of the applications has a lock.

At 915, time zone enabled application 956 releases its lock as it completes its tasks (932) that require time zone definition data version consistency. Although time zone enabled application 956 has released its lock, the time zone definition data version cannot be updated yet because time zone enabled application 958 still holds a lock.

At 916, time zone datatype manager 954 acknowledges the release of the lock.

At 917, time zone enabled application 958 releases its lock as it completes its tasks that require time zone definition data version consistency. The time zone definition data version can now be updated because no module holds a lock.

At 918, time zone datatype manager 954 acknowledges the release of the lock.

At 919, time zone datatype manager 954 notifies time zone definition manager 952 that it may now obtain a lock.

At 920, time zone definition manager 952 requests a lock to perform the update of the time zone definition data version available to the modules.

At 921, time zone datatype manager 954 acknowledges the lock request and issues a lock to time zone definition manager 952. While time zone definition manager 952 has a lock, no other lock requests will be granted.

At 922, time zone datatype manager 954 receives the new time zone definition data version from time zone definition manager 952 and makes it available to applications in the execution environment. In embodiments this step can be completed instantly and applications will be able to get a lock again shortly after the update is made available in the execution environment.

At 923, time zone enabled application 956 requests a lock before it performs another task with a set of operations during which it does not want the time zone definition data version used to change.

At 924, time zone datatype manager 954 denies the lock request because a lock has been issued to time zone definition manager 952 and that lock is still in effect.

At 925, time zone datatype manager 954 notifies time zone definition manager 952 of the completion of updating the time zone definition data to include the new version. At this point on, the new time zone definition data version in is available to the applications.

At 926, time zone definition manager 952 releases the lock as the update of time zone definition data has been completed.

An advantage of embodiments such as that shown in FIG. 9A is that subscribing applications can continue execution while time zone definition updates are applied in the background by time zone definition manager 952 and time zone datatype manager 954 and the subscribing applications are only prevented from obtaining a lock on time zone definition data for a short period of time while time zone definition manager 952 updates the time zone definition data to include the updated time zone definition data version.

At 927, time zone datatype manager 954 acknowledges the release of the lock. At this point, a lock is available to the other modules again.

At 928, time zone datatype manager 954 notifies time zone enabled application 956 that the time zone definition data version has been updated through the callback interface registered at 901 so that time zone enabled application 956 is notified that it may perform data value stage processing 508 and/or application stage functionality 510 of FIG. 5 if desired.

At 929, time zone datatype manager 954 notifies time zone enabled application 958 that the time zone definition data version has been updated through the callback interface registered at 903, so that time zone enabled application 958 is notified that it may perform data value stage processing 508 and/or application stage functionality 510 of FIG. 5 if desired.

At 930, time zone enabled application 956 requests a lock. This is a similar request as the request made at 905.

At 931, time zone datatype manager 954 acknowledges the lock request and issues a lock to time zone enabled application 956. This is similar to the granting of the lock at 906, except that the time zone definition data version has been updated so the exact same operations 909 might produce a different result if performed again after the lock is obtained at 931 due to the changes in the updated time zone definition data version.

FIG. 9B is a sequence diagram of functionality of time zone definition management module 16 and time zone enabled application 18 of FIG. 1 and provides an example time zone update scenario in accordance with one embodiment.

At 930, time zone enabled application 956 requests a lock before Value Stage functionality and Application Stage functionality is performed. The lock requested at 930 is similar to the lock requested at 905 in FIG. 9A because the lock prevents time zone datatype manager 954 from updating the time zone version of the execution environment.

At 931, time zone datatype manager 954 acknowledges the lock request and issues a lock to time zone enabled application 956.

At 933, time zone enabled application 958 requests a lock. This is the same request as 930.

At 934, time zone datatype manager 954 acknowledges the lock request and issues a lock to time zone enabled application 958. This is the same as 931.

At 935, time zone enabled application 956 requests time zone datatype manager 954 to perform Value Stage functionality such as that shown in FIG. 7 above. Time zone enabled application 956 can provide one or more time values to evaluate.

At 936, time zone datatype manager 954 sends a request to time zone definition manager 952 to determine whether any of the values sent in 935 are impacted by the time zone definition data update and if so what the type(s) of impact are for each impacted value.

At 937, time zone definition manager 952 provides the result of the determining at 936 to time zone datatype manager 954.

At 938, time zone datatype manager 954 provides the result received at 937 to time zone enabled application 956. This completes the performance of Value Stage functionality with respect to time zone enabled application 956 which can now proceed to perform Application Stage functionality.

At 939, time zone enabled application 956 performs Application Stage functionality. For example, time zone enabled application 956 can resolve the impact(s) as defined by the application's specification.

At 940, there could be an attempt to add a new version before the update to the previous version is completed. Normally this should not happen because there typically will be an interval of at least a few days between time zone data releases and performing a whole time zone data version update process will typically be completed within the update interval.

At 941, the add version request is denied because a lock has been acquired by time zone enabled applications 956 and 958. In some embodiments, the request can be accepted and proceed to the time zone data stage, as shown, for example, at 908 and 910-912 of FIG. 9A. In such embodiments, time zone definition manager 952 will sleep until it acquires the lock, as shown, for example, at 912-921.

At 942, time zone enabled application 958 requests time zone datatype manager 954 to perform Value Stage functionality such as that shown in FIG. 7 above. Time zone enabled application 958 can provide one or more time values to evaluate. This is similar to the functionality performed at 935.

At 943, time zone datatype manager 954 sends a request to time zone definition manager 952 to determine whether any of the values sent in 942 are impacted by the time zone definition data update and if so what the type(s) of impact are for each impacted value. This is similar to the functionality performed at 936.

At 944, time zone definition manager 952 provides the result of the determining at 943 to time zone datatype manager 954. This is similar to the functionality performed at 937.

At 945, time zone datatype manager 954 provides the result received at 944 to time zone enabled application 958. This completes the performance of Value Stage functionality with respect to time zone enabled application 958 which can now proceed to perform Application Stage functionality. This is similar to the functionality performed at 938.

At 946, time zone enabled application 958 performs Application Stage functionality. This is similar to the functionality performed at 939.

At 947, time zone enabled application 956 releases the lock after it has completed performing Application Stage functionality.

At 948, time zone datatype manager 954 acknowledges the release of the lock. At this point, the lock is still in effect because the time zone enabled application 958 has not released it.

At 949, time zone enabled application 958 releases the lock after it has completed performing Application Stage functionality.

At 960, time zone datatype manager 954 acknowledges the release of the lock. At this point, no component holds a lock and the time zone data update process is complete. Notice that an application must release the lock as it completes the Application Stage, even if it is about to process time values and requires locking. By releasing the lock, time zone datatype manager 954 can tell when the time zone enabled application has completed the Application Stage and when it is ready to process the next version.

At 961, another request to add a new version is made. This is similar to the add version request at 907 and because completion of the Application Stage for the update to the previous version has been confirmed by release of the locks, this request succeeds and the time zone definition data update process is started. Time zone enabled applications 956 and/or 958 may have acquired another lock subsequent to the locks released at 947 and 949, but this add version request still succeeds and proceeds to the Time Zone Data Stage as shown beginning at 907 in FIG. 9A. However, the request by time zone definition manager 952 for locking is disallowed until all applications release their lock, as shown in 910 through 921 in FIG. 9A.

In some embodiments, locking at 930-934 can be handled transparently/automatically with the unlocking at 947-949, and 960 being replaced with application stage complete notifications. For example, in some embodiments, locking can be performed automatically when time zone datatype manager 954 sends notifications 928 and 929 to time zone applications 956 and 958, respectively, in place of the locking procedure described at 930-934. In such embodiments, 930-934 are therefore not performed and when applications 956 and 958 receive the notification 928/929, they should initiate the value stage followed by the application stage. In such embodiments, 947-949 and 960 can be replaced with notifications from each time zone enabled application 956 and 958 to time zone datatype manager 954, the notifications indicating that the respective time zone enabled application has completed the application stage. When all applications have sent an application stage complete notification, the automatic lock can be released and time zone definition manager 952 may then allow the add version to proceed at 961.

Some embodiments may use slightly different locking strategies. For example, they may have the lock expire after a certain period of time so the system can recover to the normal state in case an application fails to unlock or provide an application stage complete notification in a reasonable amount of time.

As disclosed, embodiments manage time zone definition versions and update time zone definitions dynamically while applications continue to run. The time zone definition updates can be applied and communicated to the running applications without requiring the applications to stop, shutting down, restart, or enter a maintenance mode.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to manage time zone definitions, the managing comprising:

managing access to a current time zone definition including time value data, time zone data, and version data;

receiving an update notification subscription request from a time zone enabled application;

in response to receiving a request from the time zone enabled application to lock the current time zone definition, issuing a lock to the time zone enabled application;

receiving a new time zone definition including new version data and at least one of new time value data and new time zone data;

after the time zone enabled application releases the lock on the current time zone definition, updating the current time zone definition with the new time zone definition without stopping, shutting down, or restarting the time zone enabled application;

managing access to the new time zone definition; and notifying the time zone enabled application that the current time zone definition has been updated, the notifying causing the time zone enabled application to resolve, based on the version data, any impacts of updating.

2. The non-transitory computer readable medium of claim 1, wherein the application represents time values in local time with an indicator of the version data of the time zone definition that the local time is based on.

3. The non-transitory computer readable medium of claim 1, the managing of time zone definitions by the processor further comprising:

comparing, before the updating, the new time zone definition and the current time zone definition; and determining, based on the comparing, periods of time impacted by the updating.

4. The non-transitory computer readable medium of claim 3, wherein the notifying comprises:

notifying the application of the periods of time impacted based on the determining.

5. The non-transitory computer readable medium of claim 1, wherein the updating comprises:

waiting, before the updating, when the application has the lock on the current time zone definition, for the application to release the lock;

obtaining, before the updating, the lock on the current time zone definition when the current time zone definition is not already locked; and releasing the lock after the updating.

6. The non-transitory computer readable medium of claim 1, the managing of time zone definitions by the processor further comprising receiving, after the notifying, a request from the application to determine whether one or more requested time values are impacted by the updating;

determining whether any of the requested time values are impacted by the updating; and sending, based on the determining, a response including the requested time values that are impacted by the updating, the response causing the application to resolve the impacts of the updating.

7. The non-transitory computer readable medium of claim 6, the managing of time zone definitions by the processor further comprising:

determining a type of impact for each of the requested time values that are impacted by the updating, and
wherein the sending includes sending the respective type of impact for each time value.

8. A system comprising:
a memory device configured to store a time zone manager module;
a processor in communication with the memory device, the processor device configured to execute the time zone manager module stored in the memory device;
the time zone manager module comprising:
a time zone definition manager configured to:
manage access to a current time zone definition including time value data, time zone data, and version data,
receive a new time zone definition including new version data and at least one of new time value data and new time zone data, and
in response to receiving a request from a time zone enabled application to lock the current time zone definition, issue a lock to the time zone enabled application,
after the time zone enabled application releases the lock on the current time zone definition, updating the current time zone definition with the new time zone definition without stopping, shutting down, or restarting the time zone enabled application; and
a time zone datatype manager configured to:
receive an update notifications subscription request from the time zone enabled application, and
send a time zone definition update notification to the time zone enabled application after the current time zone definition has been updated;
wherein the time zone definition update notification is configured to cause the time zone enabled application to resolve, based on the version data, any impacts of the update.

9. The system of claim 8, wherein the time zone definition manager, the time zone datatype manager, and the time zone enabled application are configured to represent time values in local time with an indicator of the version data of the time zone definition that the local time is based on.

10. The system of claim 8, wherein the time zone definition manager is further configured to:
compare, before performing an update, the new time zone definition and the current time zone definition; and
determine, based on the comparing, periods of time impacted by the update.

11. The system of claim 10, wherein the time zone datatype manager is further configured to notify the time zone enabled application of the periods of time impacted based on the determining.

12. The system of claim 8, wherein the time zone definition manager is further configured to:
wait, when the time zone enabled application has the lock on the current time zone definition, for the application to release the lock;
obtain the lock on the current time zone definition when the current time zone definition is not already locked; and
release the lock after updating the current time zone definition to include the new time zone definition.

13. The system of claim 8, wherein the time zone datatype manager is further configured to:

receive a request from the time zone enabled application to determine whether one or more requested time values are impacted by the updating;
determine which of the requested time values are impacted by the updating; and
send a response to the time zone enabled application indicating which of the requested time values were determined to have been impacted by the updating, the response causing the time zone enabled application to resolve the impacts of the update.

14. The system of claim 13, wherein the time zone datatype manager is further configured to determine a type of impact for each time value determined to have been impacted by the update, and wherein the response includes the respective type of impact for each time value in the response.

15. A method of managing time zone definitions, comprising:
managing access to a current time zone definition including time value data, time zone data, and version data;
receiving an update notification subscription request from a time zone enabled application;
in response to receiving a request from the time zone enabled application to lock the current time zone definition, issuing a lock to the time zone enabled application;
receiving a new time zone definition including new version data and at least one of new time value data and new time zone data;
after the time zone enabled application releases the lock on the current time zone definition, updating the current time zone definition with the new time zone definition without stopping, shutting down, or restarting the time zone enabled application;
managing access to the new time zone definition; and
notifying the time zone enabled application that the current time zone definition has been updated, the notifying causing the time zone enabled application to resolve, based on the version data, any impacts of updating.

16. The method of claim 15, wherein the application represents time values in local time with an indicator of the version data of the time zone definition that the local time is based on.

17. The method of claim 15, further comprising:
comparing, before the updating, the new time zone definition and the current time zone definition;
determining, based on the comparing, periods of time impacted by the updating; and
notifying the application of the periods of time impacted based on the determining.

18. The method of claim 15, wherein the updating comprises:
waiting, before the updating, when the application has the lock on the current time zone definition, for the application to release the lock;
obtaining, before the updating, the lock on the current time zone definition when the current time zone definition is not already locked; and
releasing the lock after the updating.

19. The method of claim 15, further comprising
receiving, after the notifying, a request from the application to determine whether one or more requested time values are impacted by the updating;
determining whether any of the requested time values are impacted by the updating; and sending, based on the determining, a response including the requested time values that are impacted by the updating, the response causing the application to resolve the impacts of the updating.

20. The method of claim 19, further comprising:
determining a type of impact for each of the requested time values that are impacted by the updating, and
wherein the sending includes sending the respective type of impact for each time value.

21. The non-transitory computer readable medium of claim 7, the managing of time zone definitions by the processor further comprising identifying the type of impact for each of the requested time values as one or more of a Coordinated Universal Time (UTC) mapping change, invalid local time, ambiguous local time, and/or overlapping time status change.

22. The non-transitory computer readable medium of claim 7, the managing of time zone definitions by the processor further comprising determining if the type of impact may be of interest to a particular application.

23. The non-transitory computer readable medium of claim 7, the managing of time zone definitions by the processor further comprising having the time zone enabled application examine the type of impact, field values, and condition flags to determine appropriate actions to resolve the impact.

* * * * *

UNITED STATES PATENT AND TRADEMARK OFFICE
CERTIFICATE OF CORRECTION

PATENT NO. : 9,652,258 B2
APPLICATION NO. : 13/932187
DATED : May 16, 2017
INVENTOR(S) : Chiba Page 1 of 1

It is certified that error appears in the above-identified patent and that said Letters Patent is hereby corrected as shown below:

In the Claims

In Column 19, Line 9, in Claim 8, after "processor" delete "device".

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*